United States Patent Office 3,463,982
Patented Aug. 26, 1969

3,463,982
PULSE INSERTION MEANS FOR ELIMINATION OF SERVO ERROR DUE TO PULSE DROP-OUT
Arthur H. Eldridge, Trenton, N.J., assignor to Thiokol Chemical Corporation, Bristol, Pa., a corporation of Delaware
Filed Dec. 5, 1966, Ser. No. 599,236
Int. Cl. H03k 19/22; G05b 11/00
U.S. Cl. 318—18                                  4 Claims

ABSTRACT OF THE DISCLOSURE

A servomechanism control having electronic binary memory and logic gating devices inserted between the servo control and its control signals for providing a signal pulse to replace a pulse which is lost or drops out, the electronic devices being responsive to a pulse that is present, in order that an erroneous error signal is not presented to the servo control and unwarranted action is not taken by the servo control.

---

Servo systems are inherently dependent upon information from more than one source, a comparison of the information from the several sources serving to provide an indication representative of the difference, if any, between the actual and the desired position or condition of the servo system. The result of this comparison is termed an error signal, which may be in the form of an electric voltage or current, and is applied, usually after amplification, to the servomechanism drive or servomotor for causing a reaction in a direction such as to reduce the error and cause the servo system to approach the desired or null position or condition. It is therefore clear that the loss of information from any of the sources and drop-out of the input pulse indicative thereof will result in the creation of an erroneous error signal which causes the servomotor to overcorrect in the desired direction or to reverse direction, depending upon the information input which is absent. The pulse insertion means of the present invention employ logic memory and gating devices to process the information input pulses and provide for elimination of servo error because of pulse drop-out by generating a pulse in response to a present pulse to replace the absent pulse so that the servo system remains in the position last indicated by the valid information inputs received prior to pulse drop-out. Once the channels of information are restored, the servo action then proceeds from the point at which pulse drop-out occurred.

It is therefore an object of the present invention to provide means for generating a signal to replace a signal which drops out.

Another object is the provision of means for controlling a servo system in which error introduced by the absence of an information input is eliminated.

A further object is to provide means for processing information pulse inputs to a servo control and generating a pulse to replace a pulse which drops out.

Still another object is the provision of means for association with a servo control responsive to information input pulses, which means process said pulses and are responsive to a present pulse for generating a pulse to replace a pulse which drops out.

Other objects, advantages and features of the invention will become more fully apparent from consideration of the following specification when considered in connection with the accompanying drawings in which:

FIGURE 3 shows a pair of time charts illustrating the output wave forms resulting from information input pulses under various conditions of operation.

Figure 1:
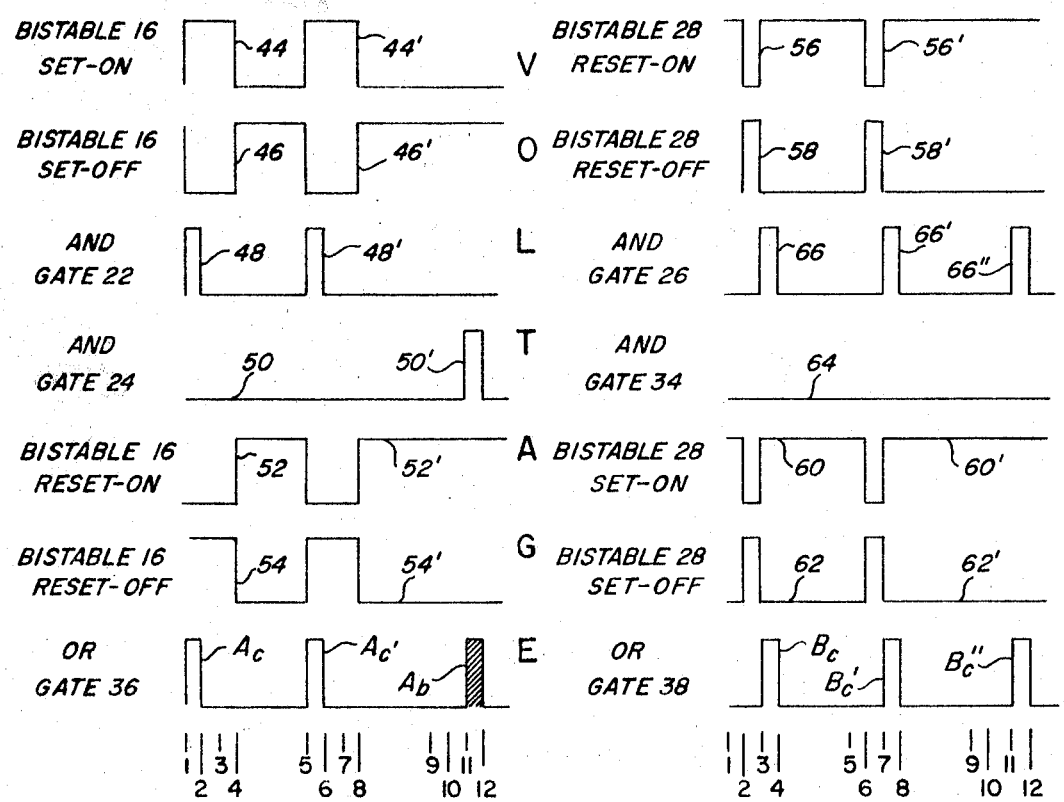
FIGURE 1 is a schematic diagram showing the relation of the pulse processing means of the present invention to servo control means.

Referring now to the drawings, wherein like reference characters designate like or corresponding parts throughout the several views, there is shown in FIGURE 1 a servo control 10 which receives and is responsive to an output 0 provided by a comparator 12 as a result of the comparison of inputs from information sources or channels A$i$ and B$i$. It is apparent that should one of the inputs be absent, the comparison made by the comparator 12 is not valid and the output 0 is erroneous. To eliminate error introduced by loss of an information input, the present invention provides means, designated generally by reference numeral 14 and shown in greater detail in FIGURE 2, which receive the information inputs and process the same before receipt by the comparator 12 and contain devices for generating an input to replace an input which becomes lost or drops out.

Figure 2:
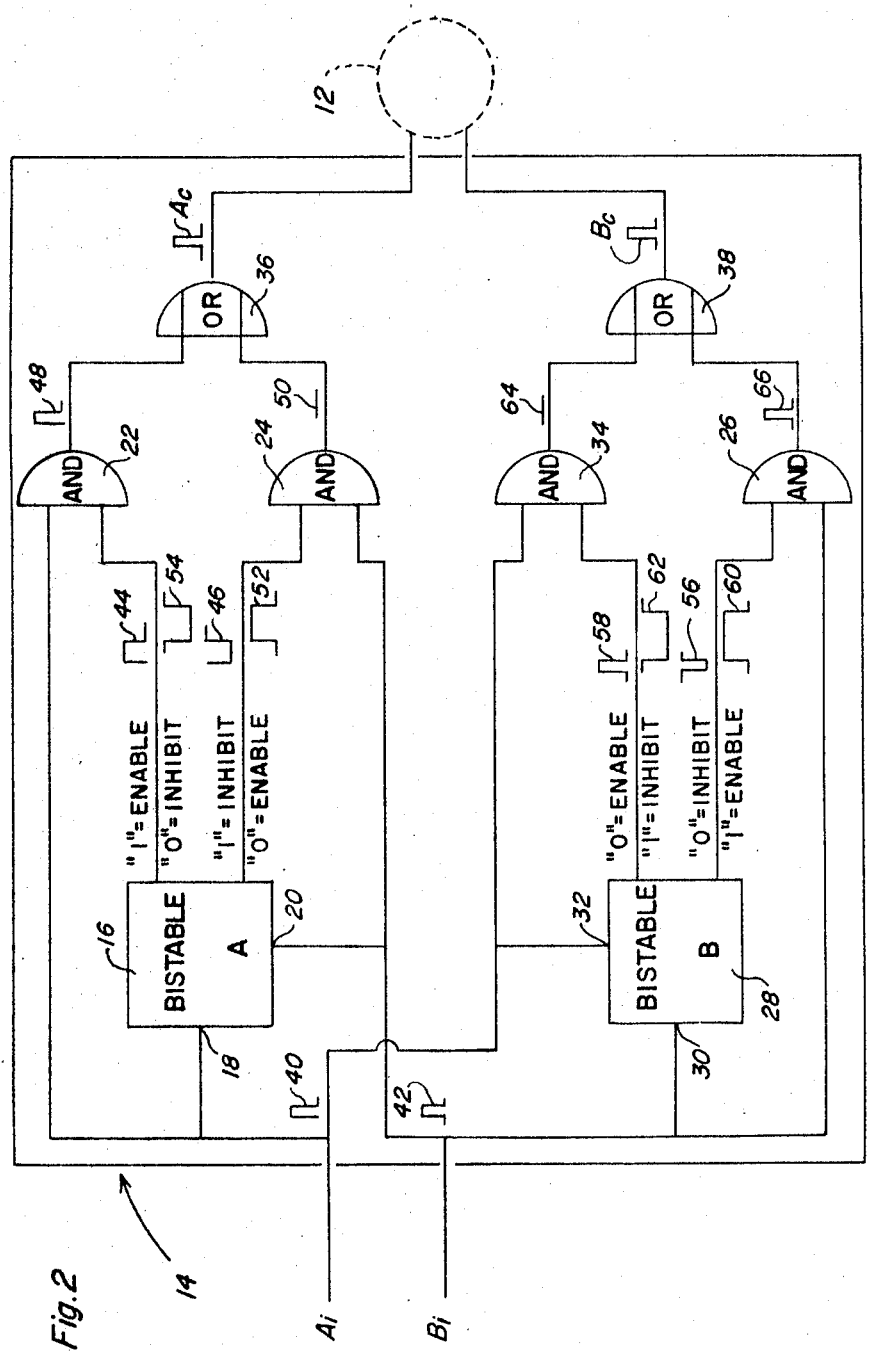
FIGURE 2 is a schematic diagram of the pulse processing means of FIGURE 1 showing the electronic devices employed.

Turning now to FIGURE 2, means 14 comprises binary memory elements, in the form of a pair of identical flip-flops or bistable multivibrators A and B, and associated logic gating devices, hereinafter described. Bistable A, designated by reference numeral 16, has a SET input 18 which receives the A$i$ channel information signal and a RESET input 20 which receives the B$i$ channel information signal, the A$i$ channel signal also going directly to an AND gate 22 and the B$i$ channel signal to an AND gate 24. Somewhat similarly, the B$i$ channel signal is received by an AND gate 26 and by the $b$ bistable, which is designated by reference numeral 28, at its SET input 30, the A$i$ channel signal being received at its RESET input 32 and by an associated AND gate 34. Thus, it is seen that the signal from an information source is simultaneously directed to the SET input of one bistable and to an AND gate associated therewith, and to the RESET input of the other bistable and an associated AND gate.

Gates 22 and 26 are similar in purpose and operation in regard to their respective bistables, the same being true of gates 24 and 34. The outputs of gates 22 and 24 are connected to an OR gate 36 and the outputs of gates 26 and 34 to an OR gate 38, the outputs of the OR gates, designated A$c$ and B$c$, being connected to the comparator 12.

Assuming the A$i$ channel signal to be leading the B$i$ channel signal, the time charts of FIGURE 3 show the A$i$ channel signal pulse 40 as having a pulse width or period from time $t1$ to time $t2$ and the B$i$ channel signal pulse 42 as extending from time $t3$ to time $t4$. The leading edge of signal pulse 40 will SET the A bistable 16 at time $t1$ and cause it to assume the "1" state, thereby yielding an ON output 44, which has an ENABLE voltage level, and an OFF output 46, which has an INHIBIT voltage level, outputs 44 and 46 persisting until the bistable is RESET at time $t4$ by the trailing edge of the B$i$ channel signal pulse 42. The ENABLE voltage of output 44 is applied to AND gate 22 and arrives there shortly after the leading edge of signal 40 because of a very small propagation delay (in the order of nanoseconds) through the bistable 16. Since the output 44 ENABLE voltage and the A$i$ channel signal 40 voltage are both positive or high and present at the same time at the AND gate 22, the output 48 of the gate is also high or in the "1" state. The INHIBIT voltage of output 46 is applied to AND gate 24 and is present there when the B$i$ channel signal pulse 42 arrives at time $t3$ with the result that the output 50 of gate 24 is in "0" state which, coupled with the "1" state output 48 of gate 22, results in a "1" state composite output A$c$ from the OR gate 36. At time $t4$, the trailing edge of the B$i$ channel signal 42 will RESET the bistable 16 which yields the "0" state with an ENABLE voltage output 52 going to AND gate 24 and an INHIBIT voltage output 54 going to AND gate 22, the voltage outputs appearing at the respective gates slightly after time $t4$ due to the propagation delay through the bistable with the result that the voltages do not arrive at the gates until after the direct signals to the gates have gone and the voltages are therefore without effect.

As hereinbefore indicated, at the time that signal pulse 40 is directed to the SET input 18 of A bistable 16, it is also directed to the RESET input 32 of B bistable 28, the trailing edge of pulse 40 causing the bistable 28 to RESET at time $t2$ and yield the "0" state with an INHIBIT voltage output 56, which goes to AND gate 26, and an ENABLE voltage output 58, which goes to AND gate 34 but does not arrive there (because of the progation delay) until after the direct signal 40 has gone and thus there is no output from the gate. The INHIBIT voltage output 56 prevents any output from gate 26 while present there; however, at time $t3$ the B$i$ channel signal 42 is applied to the B bistable 28 and will SET the bistable to the "1" state which provides an ENABLE voltage output 60 going to AND gate 26 and an INHIBIT voltage output 62 gong to the AND gate 34, which voltage outputs persist until arrival of the next A$i$ channel signal 40' has its effect on the bistable 28. Thus, there is no change in the output of gate 34, which output is designated by reference numeral 64, but at gate 26 there is coincidence of the direct signal 42 and the ENABLE voltage output 60 which results in a "1" state output 66 from gate 26. Application of outputs 64 and 66 to the OR gate 38 causes a composite output B$c$ therefrom.

Composite outputs A$c$ and B$c$ are applied to the comparator 12 which, in response thereto, sends the appropriate error signal to the servo control 10 for causing it to react in a manner to cause the servo system to approach the desired or null position or condition and reduce the error, which action causes the next information signals 40' and 42' to be closer (since the error has been reduced) and is essentially the same as if the A$i$ and B$i$ channel signals had been applied directly to the comparator in place of the composite outputs A$c$ and B$c$. As will be apparent from the foregoing description, the effects of signals 40' and 42' passing through means 14 results in outputs 44', 46', 48', 50', 52', 54', 56', 58', 60', 62', 64, A$c$' and B$c$'. However, in the instance when one of the signal pulses has dropped out or is lost because of noise or other reason, the pulse insertion means 14 of this invention operates to cause the remaining pulse present to supply a pulse to replace the pulse which is missing. Assume that the A$i$ channel signal pulse 40", which is shown in FIGURE 3 in phantom and ordinarily would occur from time $t9$ to time $t10$, is missing for whatever reason. Since the A$i$ channel signal is absent, there is no signal to SET the A bistable 16 to the "1" state there are no inputs to the AND gate 22, with the result that the bistable remains in the RESET condition caused by the B$i$ channel signal pulse 42' and there is no output from gate 22. However; the ENABLE voltage (see waveform 52' in FIGURE 3) from the bistable 16 is present at the AND gate 24 so that when the next B$i$ channel signal 42" arrives at gate 24 at time $t11$ it will be passed through as an output 50' which, in turn, is passed by the OR gate 36 as an output A$b$. Under the conditions stated, there is no change in the output of gate 34 and the pulse 42" causes the AND gate 26 to provide an output 66" which, in turn, is passed by the OR gate 38 as an output B$c$". Thus, it is seen that the missing A$i$ channel pulse has been replaced by the B$i$ channel pulse and although output A$b$ does not fill the time slot that the A$i$ channel signal output would have occupied, it will, when compared to the B$i$ channel signal output B$c$", indicate that there is substantially no time error between the channels and the servo control will not be caused to change until the next set of channel signals which, when compared, indicate an error. Somewhat similarly, should the B$i$ channel signal drop out there would be no output from AND gate 26 and the ENABLE voltage at AND gate 34 would persist so that with the arrival of the next A$i$ channel signal there would be an output from gate 34 to replace the output missing from gate 26.

The operation of the electronic pulse insertion means 14 of the present invention should be apparent. However, briefly and in summary, when both channel signals are present, means 14 processes the same and provides outputs which are essentially the same as the inputs. But when one of the signals is missing, the signal present operates to SET one of the bistables and provide the usual output as an input to the comparator 12, the same signal also serving to RESET the other bistable and thereby provide an output which serves as an input to the comparator, both inputs being substantially in time coincidence and indicating no error between the channels. Accordingly, the servo control 10 is not caused to take unwarranted action.

There has thus been provided a pulse insertion means which accomplishes the objects of the invention. Obviously, many modifications and variations of the present invention are possible in light of the above teachings. It is therefore to be understood that the invention may be practiced otherwise than as specifically described.

What is claimed is:

1. A servomechanism control means, comprising, in combination:

a servo control responsive to a control signal;

a comparison mechanism adapted to receive information inputs and compare the same, said mechanism providing said servo control with a control signal representative of said comparison mechanism comprising, a pair of bistable multivibrators, each having a SET input and a RESET input, at least one information input being applied to the SET input of one of said multivibrators and to the RESET input of the other multivibrator and another information input being applied to the RESET input of said one multivibrator and to the SET input of the other multivibrator; and each multivibrator has a pair of AND gates associated therewith, one of said gates in the SET state of the multivibrator receiving an ENABLE voltage and the other gate an INHIBIT voltage, and vice versa in the RESET state of the multivibrator and the information input to the SET input of the multivibrator also going directly to said one of the gates and the information input to the RESET input of the multivibrator also going directly to said other gate.

2. In a servo system comprising a servo control and a comparison device receiving a plurality of pulsed information inputs and delivering a control signal to the servo control, the improvement comprising:

an electronic binary element mechanism associated with said comparision device for receiving said information inputs and processing the same prior to recipt by said device, said mechanism comprising a plurality of flip-flops and gating devices which are responsive to a present input pulse for generating a pulse to replace a missing information pulse and said flip-flops are in the form of a pair of bistable multivibrators;

one information pulse going to the SET input of one multivibrator and to the RESET input of the other multivibrator and another information pulse going to SET input of said other multivibrator and to the RESET input of said one multivibrator, whereby said servo control is prevented from taking unwarranted action which it otherwise would if the missing input were not replaced.

3. The improvement of claim 2 wherein said gating devices include two pairs of AND gates, with a pair of gates associated with each of said multivibrators, respectively, and receiving the output thereof;

one of the gates of said pair receiving directly the information pulse going to the SET input of its respective multivibrator; and the other gate of said pair receiving directly the information pulse going to the RESET input of the respective multivibrator.

4. Electronic circuitry comprising binary memory elements adapted to receive a plurality of signal pulses and means, should one of the pulses be absent, for generating a pulse to replace the absent pulse, said means being responsive to a pulse that is present, comprising:

a pair of bistable multivibrators and gating devices associated therewith and receiving the outputs thereof, one of the gating devices and its respective associated multivibrator at the SET input thereof receiving directly one of said signal pulses and another of the gating devices and said associated multivibrator at the RESET input thereof receiving directly another of said signal pulses and two pairs of AND gates, a pair of said gates being associated with one of said multivibrators respectively and receiving the outputs thereof;

one of said signal pulses going directly to one multivibrator at the SET input thereof and to one of the gates of said pair associated therewith and also to the other multivibrator at the RESET input thereof and to one of the gates of said pair associated therewith; and another of said signal pulses going directly to the RESET input of said one multivibrator and to the other of the gates of said pair associated therewith and also to the SET input of said other multivibrator and to the other of the gates of said pair associated therewith.

References Cited

UNITED STATES PATENTS 3,229,270    1/1966    Rosenblatt   _____ 318—24 X
3,356,921    12/1967    Bradford et al.

ORIS L. RADER, Primary Examiner

T. E. LYNCH, Assistant Examiner

U.S. Cl. X.R.

318—28